US010167967B2

(12) United States Patent
Greggs

(10) Patent No.: US 10,167,967 B2
(45) Date of Patent: Jan. 1, 2019

(54) AIRBOX DRAIN VALVE

(71) Applicant: Nissan North America, Inc., Franklin, TN (US)

(72) Inventor: Alan Greggs, Canton, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/433,740

(22) Filed: Feb. 15, 2017

(65) Prior Publication Data

US 2018/0231136 A1    Aug. 16, 2018

(51) Int. Cl.
| | |
|---|---|
| *F16K 15/14* | (2006.01) |
| *B62D 25/08* | (2006.01) |
| *B60R 13/07* | (2006.01) |
| *B23P 19/00* | (2006.01) |

(52) U.S. Cl.
CPC ............ *F16K 15/144* (2013.01); *B23P 19/00* (2013.01); *B60R 13/07* (2013.01); *B62D 25/081* (2013.01)

(58) Field of Classification Search
CPC ........ B23P 19/00; B60R 13/07; B62D 25/081
USPC .......................................................... 137/844
See application file for complete search history.

(56) References Cited

U.S. PATENT DOCUMENTS

| | | | | |
|---|---|---|---|---|
| 2,747,922 | A | * | 5/1956 | Gibson ................... B60R 13/07 137/855 |
| 4,131,135 | A | * | 12/1978 | Aleff ..................... F16K 15/144 137/856 |
| 4,691,623 | A | | 9/1987 | Mizusawa |
| 4,886,093 | A | * | 12/1989 | Itakura .................... F04B 53/06 137/855 |
| 5,669,986 | A | | 9/1997 | Buchanan, Jr. et al. |
| 5,709,309 | A | | 1/1998 | Gallagher et al. |
| 6,347,989 | B1 | | 2/2002 | Marko et al. |
| 7,000,979 | B2 | | 2/2006 | Borkowski et al. |
| 7,243,681 | B2 | | 7/2007 | Dahm |
| 8,360,104 | B2 | | 1/2013 | Shereyk et al. |
| 8,365,771 | B2 | | 2/2013 | Xue et al. |
| 8,567,852 | B2 | | 10/2013 | Lacroix et al. |

(Continued)

FOREIGN PATENT DOCUMENTS

| | | |
|---|---|---|
| EP | 1595771 A2 | 11/2005 |
| JP | 1191633 A | 4/1999 |

OTHER PUBLICATIONS

U.S. Appl. No: 15/371,517, filed Dec. 7, 2016.

*Primary Examiner* — P. Macade Nichols

(74) *Attorney, Agent, or Firm* — Young Basile Hanlon & MacFarlane, P.C.

(57) ABSTRACT

A drain valve including: a support portion having a first end and a second end, the first end having a width that is narrower than a width of the second end; a connecting portion extending from the support portion proximate the first end, the connecting portion comprising a tip disposed at a proximal end of the connecting portion, the tip being configured to engage a drain defined by a panel; and a contoured flap extending from a hinge disposed proximate the first end from a flat lateral surface of the support portion, the contoured flap having a profile corresponding to profile of the portion of the panel and having a durometer value that: allows the contoured flap to pivot on the hinge to allow flow from the drain; and in response to a negative pressure within the drain, allows the contoured flap to prevent flow through the drain.

20 Claims, 10 Drawing Sheets

(56) References Cited

U.S. PATENT DOCUMENTS

| | | |
|---|---|---|
| 8,991,919 B2 | 3/2015 | Neuber et al. |
| 9,435,453 B1 * | 9/2016 | Shen .................... F16K 15/147 |
| 2005/0081921 A1 | 4/2005 | Blake et al. |
| 2007/0184772 A1 | 8/2007 | McConnell et al. |
| 2008/0246311 A1 | 10/2008 | Hagino et al. |
| 2014/0106658 A1 | 4/2014 | Freeman et al. |

* cited by examiner

AIRBOX DRAIN VALVE

TECHNICAL FIELD

This disclosure relates to a vehicle having a vehicle cowl structure that intakes air for circulation through a passenger compartment of the vehicle.

BACKGROUND

A vehicle may include a vehicle cowl structure disposed in an engine compartment on an opposite side of a firewall from a passenger compartment. The vehicle cowl structure generally includes one or more air receiving apertures that allow air to be drawn from outside of the vehicle into one or more vehicle cowl airboxes. The air may then be directed through ducts connecting the one or more vehicle cowl airboxes to the passenger compartment and/or an HVAC system of the vehicle.

Along with air, fluid and/or particulates may pass through the one or more air receiving apertures. The fluid and/or particulates may accumulate in the one or more vehicle cowl airboxes. Accordingly, the one or more vehicle cowl airboxes may include one or more drains. The one or more drains may facilitate draining of the one or more vehicle cowl airboxes and may allow air to be drawn into the one or more vehicle cowl airboxes.

SUMMARY

Disclosed herein are aspects, features, elements, implementations, and embodiments of vehicle cowl airbox drains.

An aspect of the disclosed embodiments is a drain valve may include: a support portion having a first end and a second end, the first end having a width that is narrower than a width of the second end; a connecting portion extending from the support portion proximate the first end, the connecting portion comprising a tip disposed at a proximal end of the connecting portion, the tip being configured to engage a drain defined by a portion of a panel; and a contoured flap extending from a hinge disposed proximate the first end from a flat lateral surface of the support portion, the contoured flap having a profile corresponding to profile of the portion of the panel and having a durometer value that: allows the contoured flap to pivot on the hinge to allow flow from the drain; and in response to a negative pressure within the drain, allows the contoured flap to prevent flow through the drain.

Another aspect of the disclosed embodiments is a system for draining a vehicle cowl airbox disposed within an engine compartment of a vehicle. The system may include: a drain disposed on the vehicle cowl airbox, the drain being defined by a portion of a panel of the vehicle cowl airbox; and a drain valve that may include: a support portion having a first end and a second end, the first end having a width that is narrower than a width of the second end; a connecting portion extending from the support portion proximate the first end, the connecting portion comprising a tip disposed at a proximal end of the connecting portion, the tip being configured to be received by a drain defined by a portion of a panel; and a contoured flap extending from a hinge disposed proximate the first end from a flat lateral surface of the support portion, the contoured flap having a profile corresponding to profile of the portion of the panel and having a durometer value that: allows the contoured flap to pivot on the hinge to allow flow from the vehicle cowl airbox; and in response to a negative pressure within the vehicle cowl airbox, allows the contoured flap to prevent flow into the vehicle cowl airbox.

Another aspect of the disclosed embodiments is a method for installing a drain valve into a drain of a vehicle cowl airbox. The method may include: engaging, with a support portion of the drain valve, a first flange of the vehicle cowl airbox attached to a portion of a lateral wall disposed adjacent to the vehicle cowl airbox; guiding the drain valve toward the drain by engaging a ramped portion of the drain valve extending from a flat lateral surface of the support portion proximate to a second end of the support portion; inserting a connecting portion that extends from a first end of the support portion into the drain; snapping a distal end of the connecting portion having a width that is wider than the drain onto a portion of a panel of the vehicle cowl airbox that defines the drain; sealing the drain by engaging the portion of the panel with a contoured flap having a surface area that is larger than an opening of the drain and that extends from the flat lateral surface proximate the first end of the support portion; and preventing the contoured flap from passing through the drain by engaging, by the second end of the support portion, at least a portion of the lateral wall.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A vehicle may include a vehicle cowl structure disposed in an engine compartment on an opposite side of a firewall from a passenger compartment. The vehicle cowl structure generally includes one or more air receiving apertures that allow air to be drawn from outside of the vehicle into one or more vehicle cowl airboxes. The air may then be directed through ducts connecting the one or more vehicle cowl airboxes to the passenger compartment and/or a heating, ventilating, and air conditioning ("HVAC") system of the vehicle.

Along with air, fluid and/or particulates may pass through the one or more air receiving apertures. The fluid and/or particulates may accumulate in the one or more vehicle cowl airboxes. Accordingly, the one or more vehicle cowl airboxes may include one or more drains. The one or more drains facilitate draining of the one or more vehicle cowl airboxes.

Consequently, a drain provides an opening in a respective vehicle cowl airbox that may allow air to be drawn into the vehicle cowl airbox. For example, when the HVAC system is in use, a negative air pressure is generated within the vehicle cowl airbox. The negative air pressure may cause air from outside of the vehicle cowl airbox to be drawn in through the opening of the drain. The air drawn in from outside of the vehicle cowl airbox may include fumes from fuel used to power the vehicle. For example, the vehicle may include a compression ignition engine that relies on diesel fuel to power the compression ignition engine.

The air, including the fumes, may be drawn into the vehicle cowl airbox and directed to the passenger compartment and/or the HVAC system which then directs the air, and fumes, into the passenger compartment. The fumes may be inhaled by a driver and/or passenger of the vehicle. Accordingly, a drain valve, such as is described herein, that facilitates draining of a vehicle cowl airbox and prevents air from being drawn back through the drain into the vehicle cowl airbox, may be desirable. As will be described below, a drain valve may include a flap having a durometer valve that allows the flap to facilitate draining of a vehicle cowl airbox and a surface area that allows the flap to seal against a drain to prevent air from being drawn into the vehicle cowl airbox through the drain.

Figure 1:
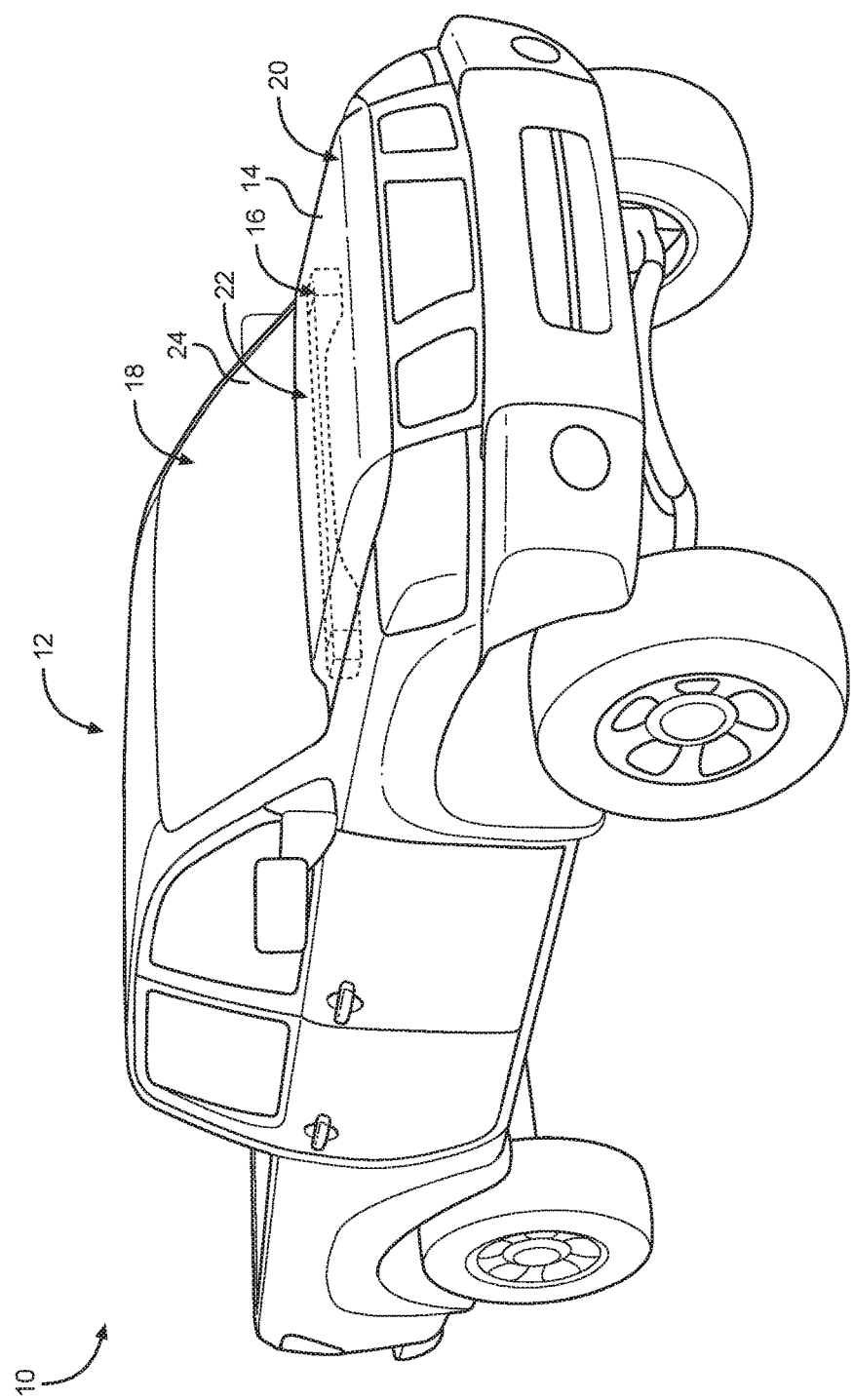
FIG. 1 generally illustrates a front perspective view of a vehicle according to the principles of the present disclosure.
Figure 2:
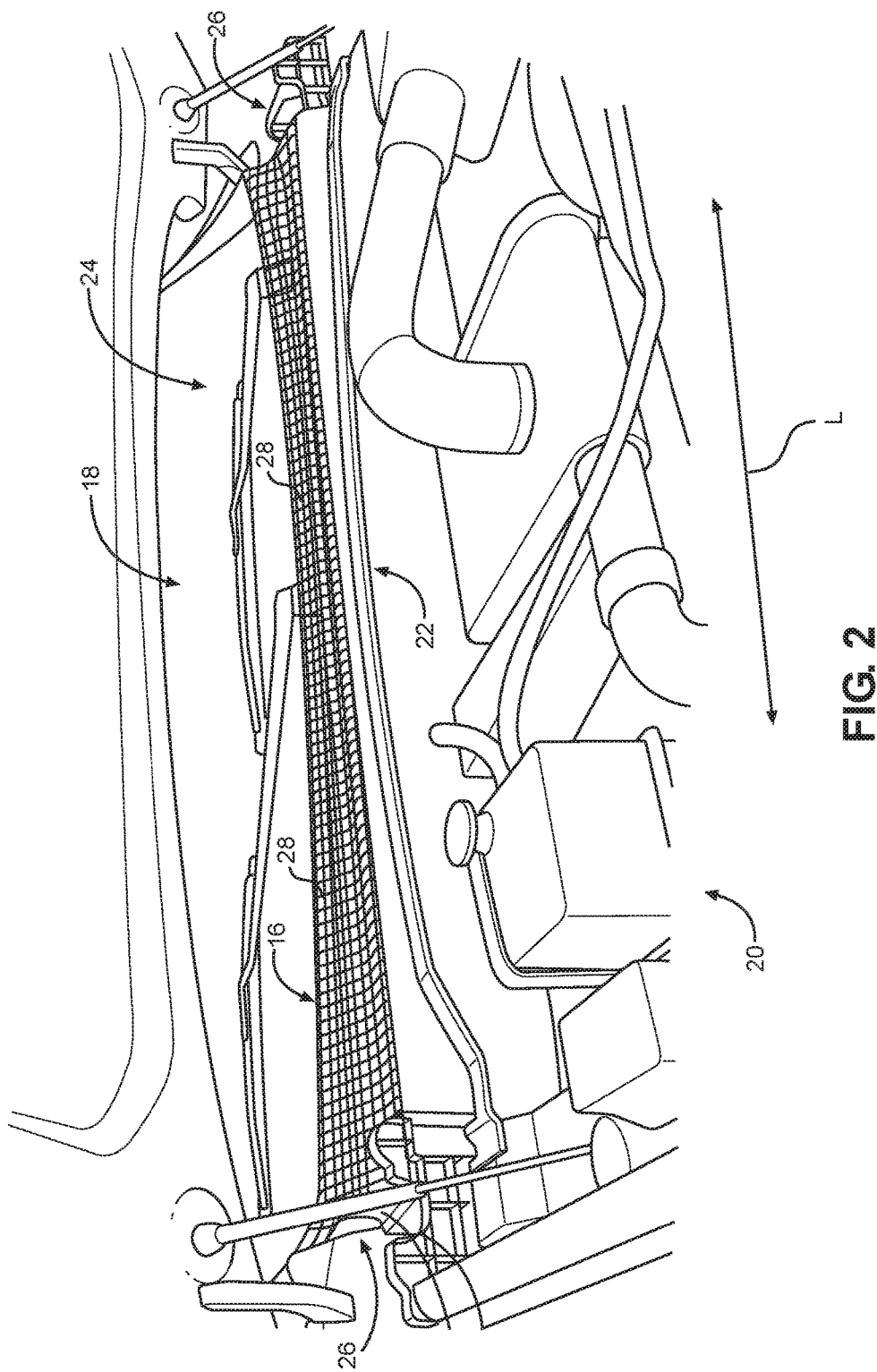
FIG. 2 generally illustrates a partial front perspective view of a portion of an engine compartment including a vehicle cowl of the vehicle generally illustrated in FIG. 1.

FIGS. 1 and 2 generally illustrate a front perspective view of a vehicle 10 according and a partial front perspective view of a portion of an engine compartment 20 respectively. The vehicle 10 includes a vehicle body 12, a hood 14, and a vehicle cowl 16. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood is in a first or open position and the hood 14 covers the engine compartment when the hood 14 is in a second or closed position. The passenger compartment 18 is disposed rearward of the engine compartment 20. The vehicle 10 may include an internal combustion engine, one or more electric motors, and/or a combination thereof. In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses components of, for example, a compression ignition engine. The vehicle 10 may include additional or fewer features than this generally illustrated in FIGS. 1 and 2 and/or disclosed herein.

In some embodiments, the vehicle body 12 includes a vehicle cowl structure 22 disposed in the engine compartment 20 adjacent a firewall that separate the passenger compartment 18 from the engine compartment 20. The vehicle cowl 16 is disposed within the vehicle cowl structure 22 near the firewall and adjacent a windshield 24. The vehicle cowl 16 extends in a lateral direction L and is secured to a portion of the engine compartment 20 at lateral ends 26 of the vehicle cowl 16. The lateral ends 26 are secured to the portion of the engine compartment 20 by in a conventional manner. In some embodiments, the vehicle cowl 16 is secured to a portion of the firewall at a rearward side of the vehicle cowl 16.

The vehicle cowl 16 may be a component of an air ventilation system of the vehicle 10. The air ventilation system provides ventilated air to various portions and/or components of the vehicle 10. For example, the vehicle cowl 16 is configured to draw in air from an area surrounding an exterior of the vehicle 10. The vehicle cowl 16 is configured to direct the drawn in air into the passenger compartment 18. The vehicle cowl 16 includes a plurality of air receiving apertures 28. The air drawn into the vehicle cowl 16 is drawn in through the air receiving apertures 28. In some embodiments, the vehicle cowl 16 directs air drawn in through the air receiving apertures 28 to a heating, ventilation, and air conditioning ("HVAC") system of the vehicle 10. The drawn in air may be directed to the HVAC system and/or into the passenger compartment 18 through one or more ducts coupling the vehicle cowl 16 to HVAC system and/or the passenger compartment 18.

Figure 3:
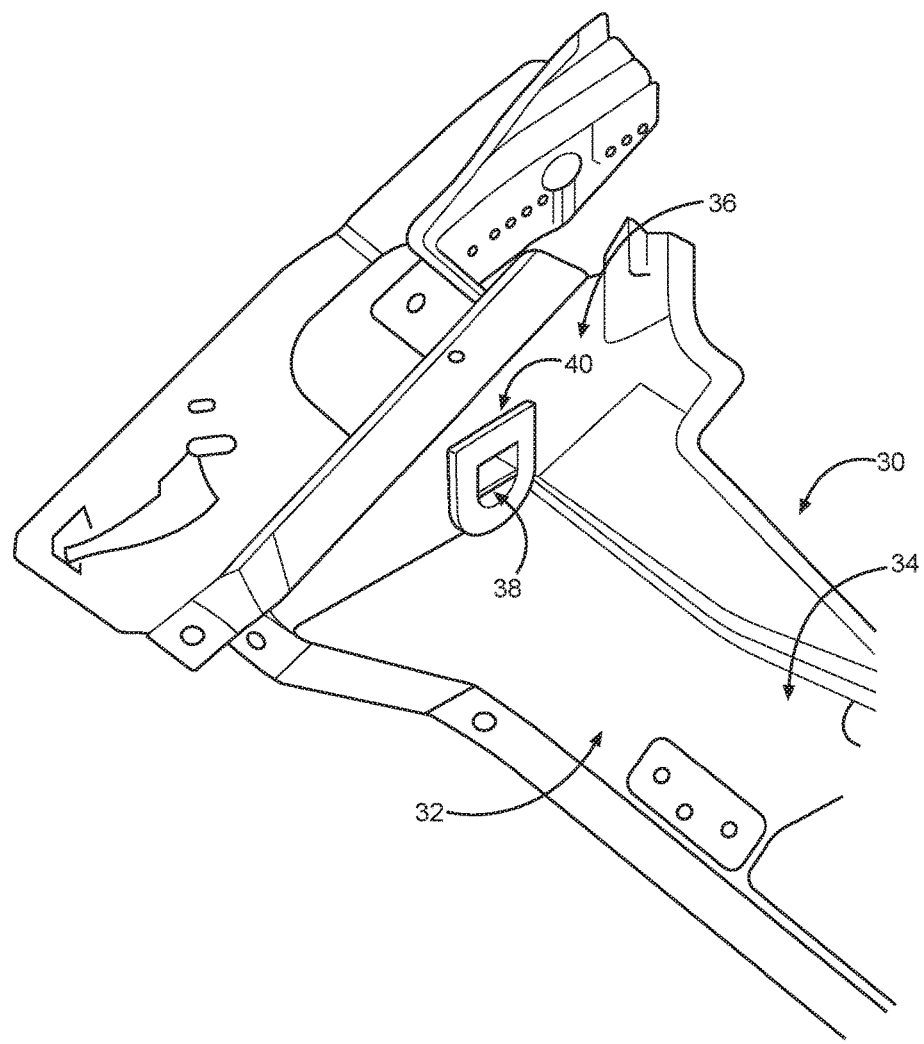
FIG. 3 generally illustrates a partial perspective view of a vehicle cowl airbox according to the principles of the present disclosure.

FIG. 3 generally illustrates a partial perspective view of a vehicle cowl airbox, such as a first vehicle cowl airbox 30, according to the principles of the present disclosure. The first vehicle cowl airbox 30 is disposed within the vehicle cowl 16 beneath the air receiving apertures 28. The first vehicle cowl airbox 30 includes a first cowl panel 32 that defines a lower portion of the first vehicle cowl airbox 30. The first cowl panel 32 may be a one-piece, unitary member that is formed as a contoured sheet element. For example, the first cowl panel 32 may comprise a rigid lightweight material, such as hard rigid plastic or lightweight sheet metal, that defines the lower portion of the first vehicle cowl airbox 30. The first cowl panel 32 includes a trough shaped center section 34 and a first lateral end wall 36. While only a first lateral end wall 36 is illustrated, it should be understood that the first vehicle cowl airbox 30 may include a second lateral end wall disposed on an opposite end of the first vehicle cowl airbox 30 from the first lateral end wall 36. Further, the second lateral end wall may include features similar or identical to the features described herein with respect to the first lateral end wall 36.

In some embodiments, the air is drawn into the first vehicle cowl airbox 30 through the air receiving apertures 28. The air receiving apertures 28 are configured such that, along with air, flow, such as fluid and/or particulates, may be drawn in and/or pass through the air receiving apertures 28 into the first vehicle cowl airbox 30. For example, the air receiving apertures 28 may be exposed to an exterior portion of the vehicle 10. Fluid, such as water and/or other fluids, may pass through the air receiving apertures 28 into the first vehicle cowl airbox 30. Additionally, or alternatively, particulates, such as natural debris (e.g., tree leaves and/or other natural debris proximate to the exterior of the vehicle 10) and/or synthetic debris (e.g., food wrappers and/or other synthetic debris proximate to the exterior of the vehicle 10) may pass through the air receiving apertures 28 into the first vehicle cowl airbox 30.

The flow may collect or accumulate on the first cowl panel 32. For example, water may pass through the air receiving apertures 28 and may collect or pool on the first cowl panel 32. Accordingly, the first vehicle cowl airbox 30 is configured to drain flow from the first vehicle cowl airbox 30. For example, the first vehicle cowl airbox 30 includes vent pipe or syphon tube 38 disposed in an opening disposed at a low point of the first vehicle cowl airbox 30. For example, and is as generally illustrated in FIG. 3, the syphon tube 38 is disposed in a drain 40 in the first lateral end wall 36. The drain 40 is disposed on a portion of the first lateral end wall 36 such that gravity acting on flow within the first vehicle cowl airbox 30 is drained toward the drain 40. As described above, the first vehicle cowl airbox 30 may include a second lateral end wall. The second lateral end wall may include a syphon tube 38 disposed in a drain 40 disposed at a similar location on the second lateral end wall as the drain 40 on the first lateral end wall.

Figure 4:
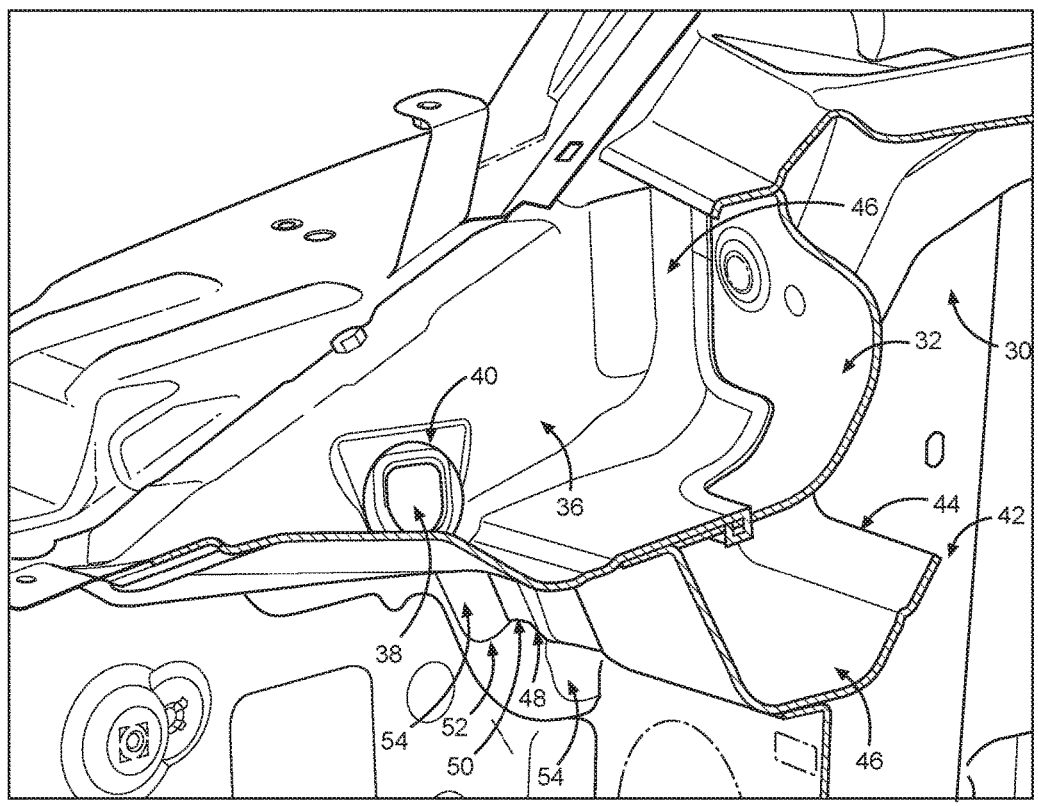
FIG. 4 generally illustrates a partial perspective view of first and second vehicle cowl airboxes according to the principles of the present disclosure.

In some embodiments, the vehicle cowl 16 includes a first vehicle cowl airbox 30 and a second vehicle cowl airbox 42 as is generally illustrated in FIG. 4. The second vehicle cowl airbox 42 is disposed beneath the first vehicle cowl airbox 30. The second vehicle cowl airbox 42 extends laterally within the vehicle cowl 16. The second vehicle cowl airbox 42 includes a second cowl panel 44. The second cowl panel 44 may be a one-piece, unitary member that is formed as a contoured sheet element. For example, the second cowl panel 44 may comprise a rigid lightweight material, such as hard rigid plastic or lightweight sheet metal, that defines the lower portion of the second vehicle cowl airbox 42. The second cowl panel 44 may include a trough shaped center section 44'.

Flow collecting on the first cowl panel 32 may spill out of the first vehicle cowl airbox 30 through an overflow opening 46 into the second vehicle cowl airbox 42. For example, flow in the first vehicle cowl airbox 30 may pass through the overflow opening 46 when flow collecting on the first cowl panel 32 collects faster than the syphon tube 38 can drain the first vehicle cowl airbox 30, when the vehicle 10 translates such that flow within the first vehicle cowl airbox 30 is splashed toward the overflow opening 46, and/or other suitable situations that may cause the flow within the first vehicle cowl airbox 30 to pass through the overflow opening 46 and into the second vehicle cowl airbox 42.

Figure 5:
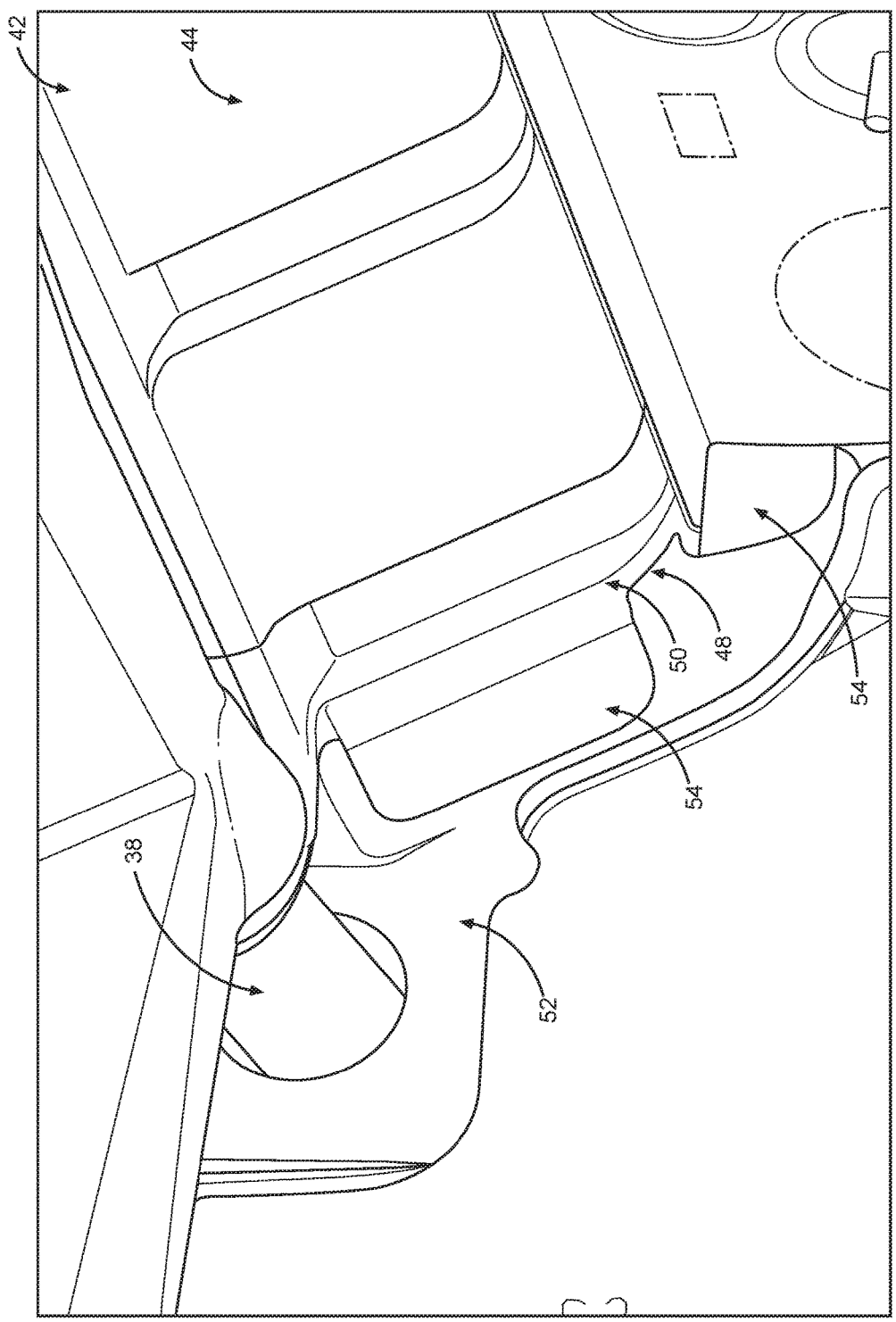
FIG. 5 generally illustrates a perspective view of a portion of a vehicle cowl airbox according to the principles of the present disclosure.

Flow that passes through the overflow opening 46 may collect or accumulate on the second cowl panel 44. The second vehicle cowl airbox 42 includes a drain 48 as is generally illustrated in FIGS. 4 and 5. The drain 48 is disposed at a low point of the second vehicle cowl airbox 42 on the second cowl panel 44. For example, the drain 48 is disposed on a portion of the second cowl panel 44 such that gravity acting on flow within the second vehicle cowl airbox 42 is drained toward the drain 48. In some embodiments, the drain 48 is disposed on the second cowl panel 44 adjacent a first lateral end wall 50. While only a first lateral end wall 50 is illustrated, it should be understood that the second vehicle cowl airbox 42 may include a second lateral end wall disposed on an opposite end of the second vehicle cowl airbox 42 from the first lateral end wall 50. Further, the second lateral end wall may include features similar or identical to the features described herein with respect to the first lateral end wall 50. Additionally, or alternatively, the second vehicle cowl airbox 42 may include another drain 48 disposed adjacent the second lateral end wall.

In some embodiments, the second vehicle cowl airbox 42 is secured to a first engine compartment lateral wall 52. The second vehicle cowl airbox 42 is secured to the first engine compartment lateral wall 52 by using any conventional manner. For example, the second vehicle cowl airbox 42 includes one or more flanges 54. The flanges 54 are disposed on the second cowl panel 44 near or adjacent the first lateral end wall 50. The flanges 54 are secured to the first engine compartment lateral wall 52 using any conventional manner. For example, the flanges 54 may be welded to the first engine compartment lateral wall 52. In some embodiments, and as is generally illustrated in FIG. 5, the flanges 54 and the second cowl panel 44 defines the drain 48. While only a first engine compartment lateral wall 52 is illustrated and described herein, the second vehicle cowl airbox 42 is secured to a second engine compartment lateral wall in a similar or identical manner as the second vehicle cowl airbox 42 is secured to the first engine compartment lateral wall 52.

Figure 6:
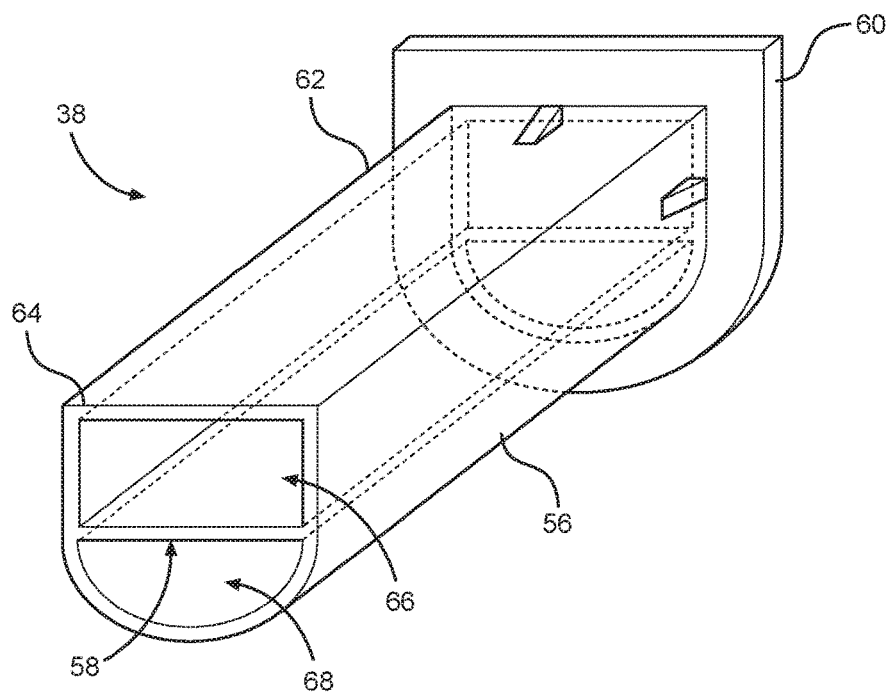
FIG. 6 generally illustrates a perspective view of a syphon tube according to the principles of the present disclosure.
Figure 7:
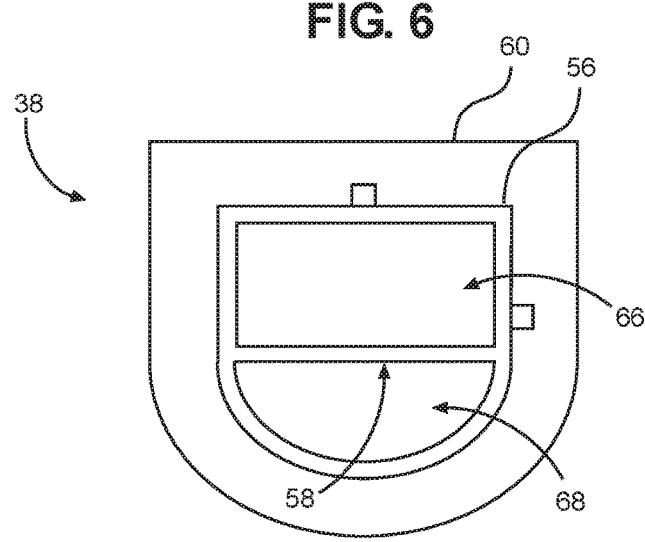
FIG. 7 generally illustrates an end view of the syphon tube generally illustrated in FIG. 6.

An example syphon tube, such as the syphon tube 38, is generally illustrated in FIGS. 6 and 7. The syphon tube 38 may be a one-piece, unitary member comprising a hard rigid material, such as a hard rigid plastic material. The syphon tube 38 includes a hollow tubular portion 56 and a longitudinally extending divider 58 disposed within the hollow tubular portion 56. The syphon tube 38 includes a radially extending mounting flange 60 disposed on or near a first syphon tube end 62. In some embodiments, the syphon tube 38 may include an O-ring seal or gasket sandwiched between the mounting flange 60 and the first lateral end wall 36 of the first vehicle cowl airbox 30 when the syphon tube 38 is installed in and/or received by the drain 40. The O-ring provides a water tight seal between the mounting flange 60 and the first vehicle cowl airbox 30.

The syphon tube 38 includes a second syphon tube end 64 disposed opposite the first syphon tube end 62. The second syphon tube end 64 may be received by an aperture in the first engine compartment lateral wall 52, such that, flow within the first vehicle cowl airbox 30 is drained through the first engine compartment lateral wall 52.

In some embodiments, the divider 58 extends longitudinally through an axial opening of the hollow tubular portion 56 from the first syphon tube end 62 to the second syphon tube end 64. The divider 58 splits or divides the hollow tubular portion 56 into a first or upper passageway 66 and a second or lower passageway 68. In some embodiments, the upper passageway 66 may have a larger cross sectional area than the lower passageway 68. In some embodiments, flow collecting on the first cowl panel 32 may be drained through the lower passageway 68. Draining flow through the lower passageway 68 results in a syphon effect causing air to be drawn into the upper passageway 66. The air drawn into the upper passageway 66 is drawn from an area on a side of the first engine compartment lateral wall 52 opposite the side of the first engine compartment lateral wall 52 adjacent to the first vehicle cowl airbox 30. The air drawn into the upper passageway 66 allows flow to drain evenly through the lower passageway 68.

In some embodiments, air is drawn into the first vehicle cowl airbox 30 through the upper passageway 66, the lower passageway 68, or both when the HVAC system of the vehicle 10 is in use. The air passes through the HVAC system and may be directed to the passenger compartment 18 when the HVAC system is in use. Air drawn into the first vehicle cowl airbox 30 may include fumes from fuel used to power the vehicle 10. For example, as described above, the vehicle 10 may include a compression ignition engine which may rely on diesel fuel to power the compression ignition engine and, accordingly, the vehicle 10. The air drawn into the first vehicle cowl airbox 30 may include diesel fumes which may include an unpleasant odor. The odor may be directed, with the air from the first vehicle cowl airbox 30 into the passenger compartment 18 when the HVAC system is in use. A drain valve, according to the principles of the present disclosure, is configured to prevent air from being drawn into the first vehicle cowl airbox 30 when the HVAC system is in use.

Figure 8:
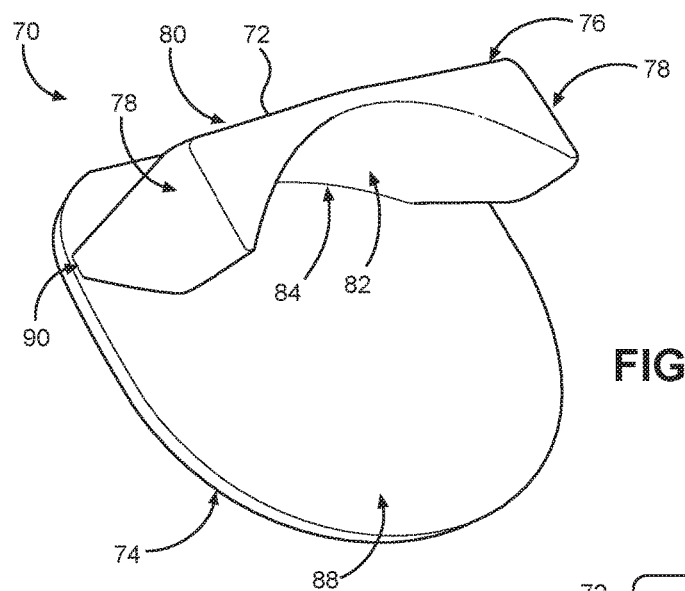
FIG. 8 generally illustrates a perspective view of a drain valve according to the principles of the present disclosure.
Figure 9:
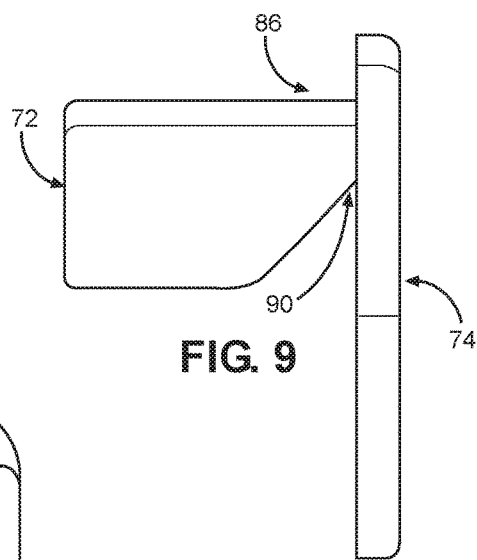
FIG. 9 generally illustrates a side view of a drain valve according to the principles of the present disclosure.
Figure 10:
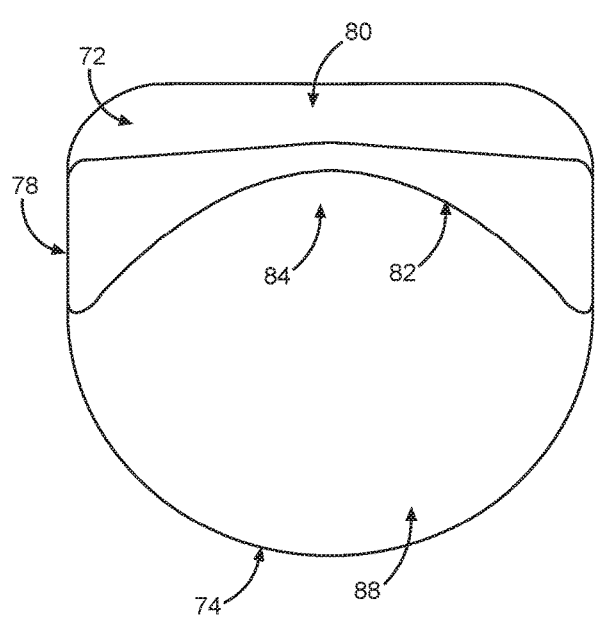
FIG. 10 generally illustrates a front view of a drain valve according to the principles of the present disclosure.

For example, FIG. 8-10 generally illustrate a drain valve 70 according to the principles of the present disclosure. The drain valve 70 may be a one-way drain valve or other suitable drain valve. The drain valve 70 is configured to prevent air from being drawn into the first vehicle cowl airbox 30 when the HVAC system is in use. The drain valve 70 includes a connecting portion 72 extending away from a flap 74. The connecting portion 72 includes a top surface 76 and sides 78. The top surface 76 and the sides 78 is arranged such that an exterior profile 80 of the connecting portion 72 corresponds to an interior profile of the upper passageway 66.

The connecting portion 72 includes a bottom surface 82 disposed on a side of the connecting portion 72 opposite the top surface 76. The bottom surface 82 includes a curved interior profile 84. The connecting portion 72 includes a hinge 86 disposed at or near the top surface 76 on a side of the connecting portion 72 facing the flap 74. The flap 74 includes a flat surface 88. The flat surface 88 includes a planar or substantially planar surface disposed on a side of the flap 74 facing the connecting portion 72. The flap 74 includes an attachment point 90. The attachment point 90 is disposed on the flat surface 88. The flap 74 may be secured, attached, coupled, and/or connected to the hinge 86 at the attachment point 90. The flap 74 include a surface area that is larger than a surface area of the second syphon tube end 64.

In some embodiments, the drain valve 70, including the flap 74 and the connecting portion 72, may be a one-piece, unitary member comprising a semi-ridge material. For example, the drain valve 70 may be comprised of a semi-rigid rubber or plastic material. In some embodiments, the drain valve 70 may comprise a material having a durometer value that allows the flap 74 to pivot, at the attachment point 90, on the hinge 86. In some embodiments, the flap 74 may be separate from the connecting portion 72 and may be attached using any conventional manner to the connecting portion 72. The flap 74 may comprise a material having a durometer value that allows the flap 74 to pivot, at the attachment point 90, on the hinge 86.

Figure 11:
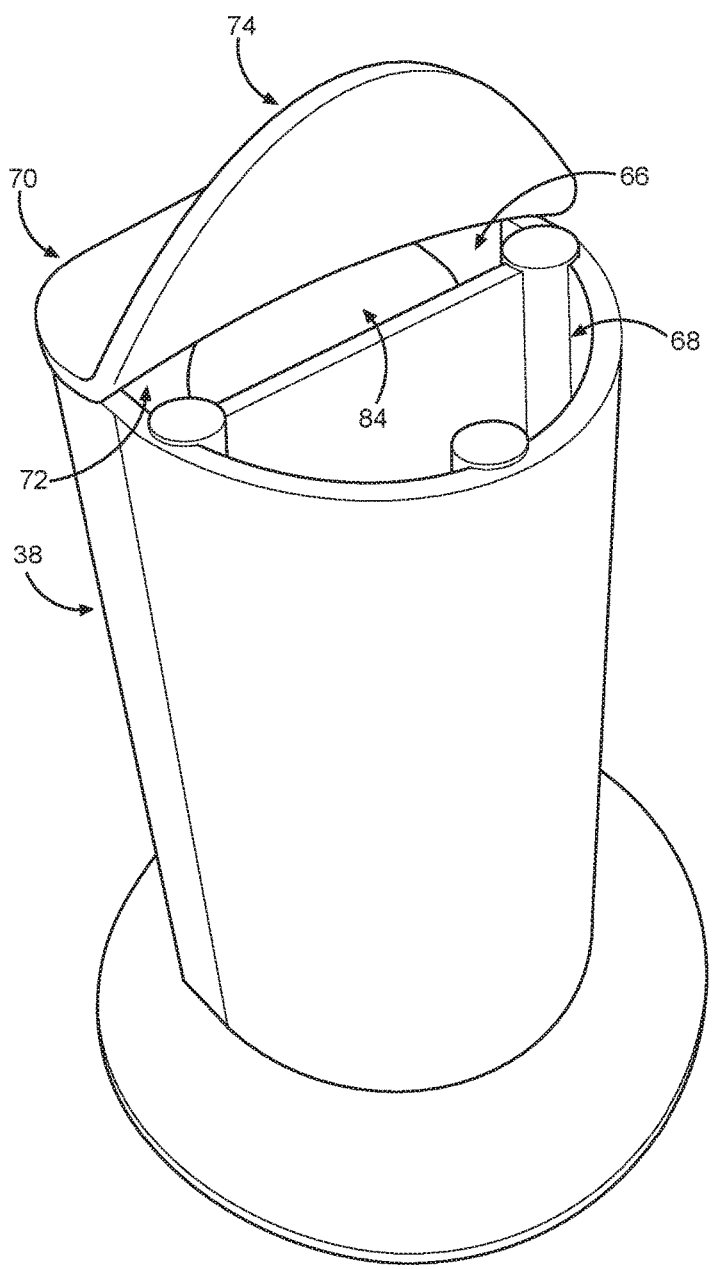
FIG. 11 generally illustrates a drain valve and a syphon tube according to the principles of the present disclosure.

In some embodiments, the drain valve 70 may be configured to be attached to and/or received by the syphon tube 38 as is generally illustrated in FIG. 11. As described above, the connecting portion 72 includes an exterior profile 80 that corresponds to an interior profile of the upper passageway 66. The connecting portion 72 is inserted into the syphon tube 38 at the second syphon tube end 64. For example, the connecting portion 72 is inserted into a portion of the upper passageway 66 located near the second syphon tube end 64. The exterior profile 80 is configured such that the connecting portion 72 fits snug within the upper passageway 66.

As described above, the syphon tube 38 is configured to allow flow, such as fluid, to drain from the first vehicle cowl airbox 30 through the lower passageway 68. At same or substantially the same time, air is syphoned into the first vehicle cowl airbox 30 through the upper passageway 66. As flow is drained through the lower passageway 68, the flow acts on the flap 74 by pushing the flap 74 away from the syphon tube 38. When the flap 74 is pushed away from the syphon tube 38, the flap 74 pivots on the hinge 86. When the flap 74 pivots on the hinge 86, the bottom surface 82 of the connecting portion 72 allows air to be drawn into the first vehicle cowl airbox 30 through the upper passageway. For example, as described above, the bottom surface 82 includes a curved interior profile 84. The curved interior profile 84 acts as a cutout portion of the connecting portion 72 such that the connecting portion 72 does not block a substantial portion of the upper passageway 66.

In some embodiments, the drain valve 70 prevents air from being drawn into the first vehicle cowl airbox 30 when the HVAC system is in use. As described above, when the HVAC system of the vehicle 10 is in use, air is drawn into the first vehicle cowl airbox 30 through the syphon tube 38. The air, including fumes, such as diesel fumes having an unpleasant odor, may then be directed to the passenger compartment 18 through the HVAC system. When the HVAC system is in use, the HVAC system generates a negative air pressure (e.g., a vacuum) within the first vehicle cowl airbox 30. The negative air pressure draws air into the first vehicle cowl airbox 30 through the syphon tube 38.

As described above, the flap 74 includes a surface area that is larger than a surface area of the second syphon tube end 64. The negative air pressure, generated by the HVAC system, within the first vehicle cowl airbox 30 generates a negative air pressure within the syphon tube 38. For example, a negative air pressure within the first vehicle cowl airbox 30 will create a negative air pressure within the upper passageway 66 and the lower passageway 68. The negative air pressure within the syphon tube 38 applies a pulling force on the flap 74 in the direction of the syphon tube 38. The force applied to the flap 74 may cause the flap 74 to pivot on the hinge 86 and to move toward the syphon tube 38. The surface area of the flap 74 (e.g., being larger than the surface area of the second syphon tube end 64) allows the flap 74 to seal against the syphon tube 38 while the negative air pressure within the syphon tube 38 exists (e.g., while the HVAC system is in use). When the flap 74 is sealed against the syphon tube 38, air is prevented from being drawn into the syphon tube 38 through the upper passageway 66 and the lower passageway 68.

Figure 12:
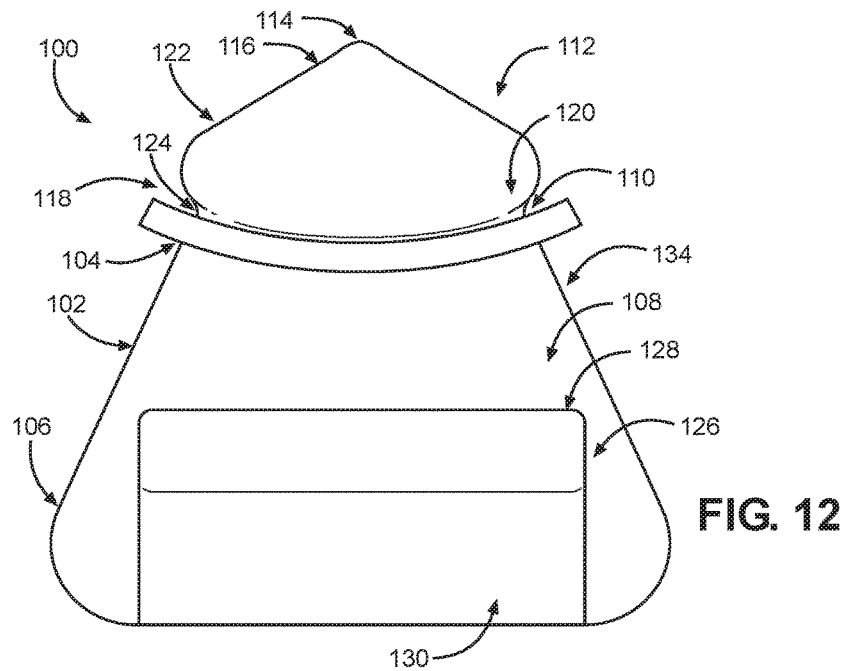
FIG. 12 generally illustrates a front view of a drain valve according to the principles of the present disclosure.
Figure 13:
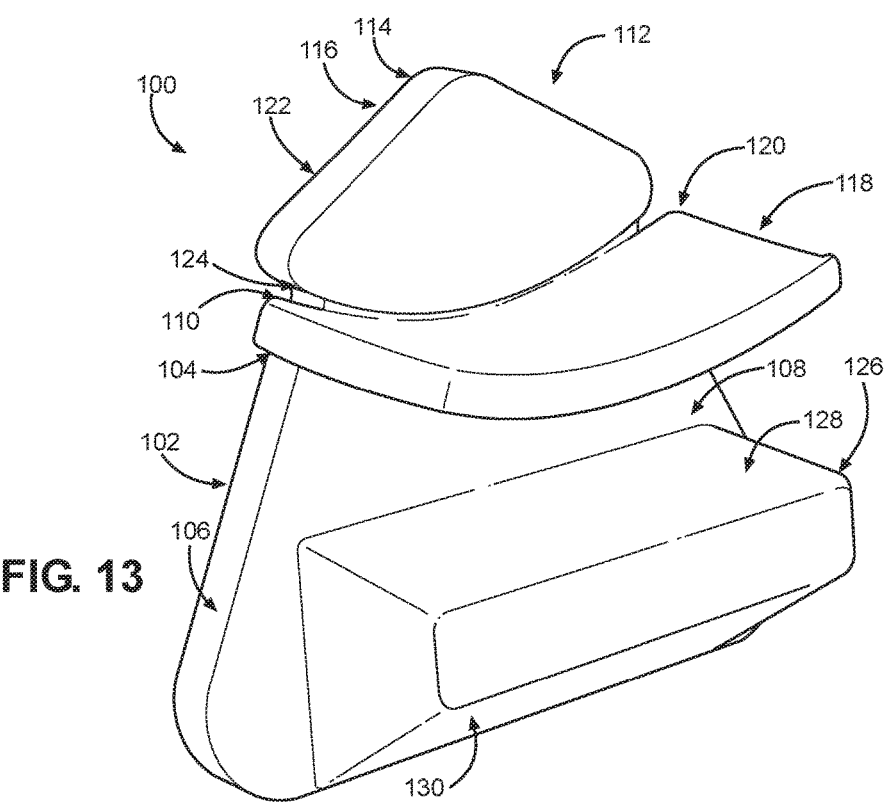
FIG. 13 generally illustrates a perspective view of a drain valve according to the principles of the present disclosure.
Figure 14:
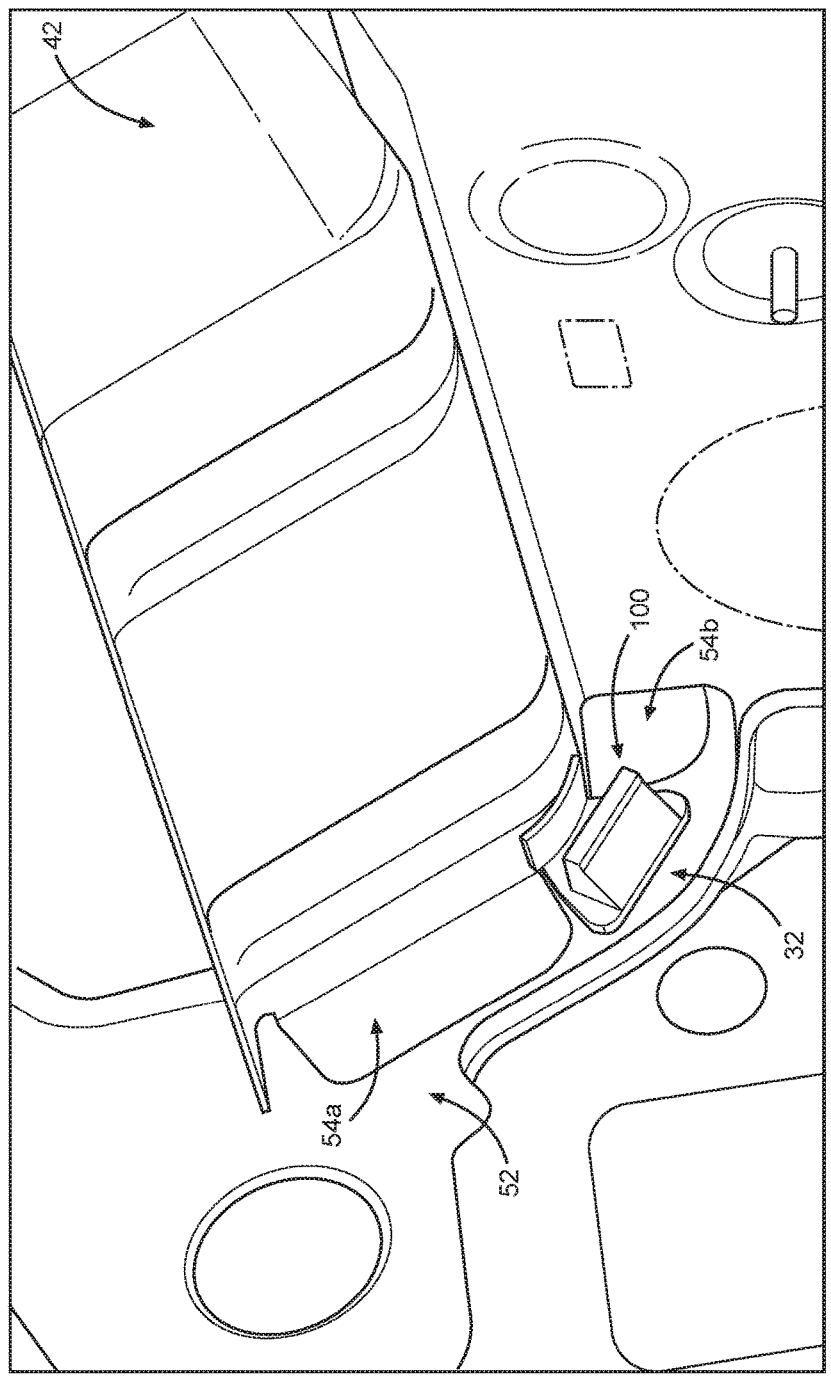
FIG. 14 generally illustrates a drain valve and a vehicle cowl airbox according to the principles of the present disclosure.

FIGS. 12-14 generally illustrate a drain valve 100 according to the principles of the present disclosure. The drain valve 100 may be a one-way drain valve or other suitable drain valve. The drain valve 100 is configured to prevent air from being drawn into the second vehicle cowl airbox 42 when the HVAC system is in use. The drain valve 100 includes a support portion 102 having a first end 104 and second end 106 opposite the first end 104. The first end 104 includes a width that is narrower than a width of the second end 106.

The support portion includes a flat lateral surface 108 and a hinge 110 disposed on the flat lateral surface 108 proximate the first end 104. The drain valve 100 includes a connecting portion 112 that extends from the support portion 102 proximate the first end 104. The connection portion 112 includes a tip 114 disposed at a proximal end 116 of the connection portion 112. The tip 114 may include a rounded tip, a pointed tip, a flat tip, or other suitably shaped tip. The tip 114 is configured to engage and/or be received by the drain 48 defined by a portion of the second cowl panel 44 of the second vehicle cowl airbox 42.

The drain valve 100 includes a contoured flap 118 that extends from the hinge 110. The contoured flap 118 includes a profile 120 that corresponds to a profile of the portion of the second cowl panel 44 that defines the drain 48. The contoured flap 118 includes a surface area that is larger than a surface area of an opening of the drain 48.

In some embodiments, the drain valve 100, including the support portion 102, the connecting portion 112, and the contoured flap 118, may be a one-piece, unitary member comprising a semi-ridge material. For example, the drain valve 100 may be comprised of a semi-rigid rubber or plastic material. In some embodiments, the drain valve 100 may comprise a material having a durometer value that allows the contoured flap 118 to pivot on the hinge 110. In some embodiments, the drain valve 100 may comprise a separate support portion 102, a separate connecting portion 112, and a separate contoured flap 118. The support portion 102 may be attached to the connecting portion 112 by any conventional manner. Similarly, the contoured flap 118 may be attached to the support portion 102 by any conventional manner. The contoured flap 118 may comprise a material having a durometer value that allows the contoured flap 118 to pivot on the hinge 110.

In some embodiments, the drain valve 100 may be inserted or installed in the drain 48. As described above, the negative air pressure generated in the second vehicle cowl airbox 42 when the HVAC system is in use causes air to be drawn into the second vehicle cowl airbox 42 through the drain 48. The air, including fumes, such as diesel fumes, may then be directed to the passenger compartment 18 through the HVAC system. The drain valve 100 is inserted or installed in the drain 48 to facilitate draining the second vehicle cowl airbox 42 and to prevent air from being drawn into the second vehicle cowl airbox 42 when the HVAC system is in use.

For example, the connecting portion 112 includes a distal end 122 opposite the proximal end 116 and extending from the first end 104 of the support portion 102. The distal end 122 includes a width that is wider than an opening of the drain 48. For example, when the tip 114 is inserted into the opening of the drain 48, the distal end 122 engages a portion of the second cowl panel 44 that defines the drain 48. An installer may apply pressure to the drain valve 100 in order to force the distal end 122 to pass through the opening of the drain 48. This may provide a snap-fit of the connecting portion 112 into the drain 48. In some embodiments, the connecting portion 112 includes a waist portion 124 disposed between the distal end 122 and the first end 104. The waist portion 124 includes a width that is narrower than the width of the distal end 122. The waist portion 124 allows the drain valve 100 to be seated into the drain 48 while the distal end 122 prevents withdrawal of the drain valve 100 from the drain 48. In some embodiments, the first end 104 includes a width that is narrower than the width of the distal end 122 and wider than the waist portion 124. In some embodiments, the first end 104 includes a width that is narrower than the width of the distal end 122 and the width of the waist portion 124.

When the drain valve 100 is installed in the drain 48, the contoured flap 118 engages a portion of the second cowl panel 44 that defines the drain 48. As described above, the drain 48 is configured to allow flow to drain from the second vehicle cowl airbox 42. When gravity acts on flow, such as fluid or particulates, within the second vehicle cowl airbox 42, the contoured flap 118 pivots on the hinge 110 away from the second cowl panel 44. For example, the flow passing through the drain 48 applies a force on the contoured flap 118 in a direction away from the second cowl panel 44. The contoured flap 118 may have a durometer valve that allows the contoured flap 118 to pivot on the hinge 110 away from the second cowl panel 44 in response to the force applied on the contoured flap 118. This may facilitate draining flow from the drain 48.

As described above, when the HVAC system of the vehicle 10 is in use, the HVAC system generates a negative air pressure within the second vehicle cowl airbox 42. The contoured flap 118 is configured to seal against a portion of the second cowl panel 44 that defines the drain 48 in response to the negative air pressure within the second vehicle cowl airbox 42. For example, the contoured flap 118 includes a surface area that is larger than a surface area of the drain 48. The negative air pressure within the second vehicle cowl airbox 42 applies a force on the contoured flap 118 in the direction of the second vehicle cowl airbox 42. When the negative air pressure applies the force on the contoured flap 118, the surface area of the contoured flap 118 extends beyond the opening of the drain 48 such that the contoured flap 118 seals against the portion of the second cowl panel 44 that defines the drain 48.

In some embodiments, the support portion 102 includes a ramped portion 126 extending from the flat lateral surface 108 and proximate the second end 106. The ramped portion 126 includes a top surface 128. The top surface 128 includes a flat or substantially flat surface that extends substantially perpendicularly with respect to the flat lateral surface 108. In some embodiments, the top surface 128 includes a surface area that is larger than the surface area of the opening of the drain 48, such that, the top surface 128 prevents the drain valve 100 from being inserted or installed into the drain 48 beyond the ramped portion 126. The ramped portion 126 includes an angled surface 130 that extends at an angle relative to the flat lateral surface 108. The angle may be between 90° and 180° relative to the flat lateral surface 108. For example, the angled surface 130 may extend at a 45° angle relative to the flat lateral surface 108.

In some embodiments, the ramped portion 126 is configured to facilitate directional guidance of the drain valve 100 into the drain 48. For example, an installer may engage the ramped portion 126. The installer may use a thumb or finger to apply pressure on the ramped portion 126. The angle of the angled surface 130 may allow an installer to apply pressure to the ramped portion 126 which may allow the support portion 102 to engage with the first engine compartment lateral wall 52. The installer may then continue to apply pressure to the ramped portion 126 until the connecting portion 112 engages the drain 48.

In some embodiments, the support portion 102 is configured to engage one or more of the flanges 54. As described above, the second cowl panel 44 includes one or more flanges 54. For example, the second cowl panel 44 includes a first flange 54a and a second flange 54b as illustrated in FIG. 14. The first flange 54a and the second flange 54b is attached to the first engine compartment lateral wall 52, as described above. A space or opening 132 between the first flange 54a and the second flange 54b is disposed adjacent to the drain 48. The second end 106 of the support portion 102 includes a width that is wider than a width of the opening 132.

When the connecting portion 112 is snapped into the drain 48, as described above, the second end 106 engages a portion of the first flange 54a, a portion of the second flange 54b, or a combination thereof. For example, the second end 106 may be pinched between the portion of the first flange 54a and the portion of the second flange 54b. The second end 106, when pinched between the portion of the first flange 54a and the portion of the second flange 54b may prevent withdrawal of the drain valve 100 from the drain 48. Additionally, or alternatively, second end 106 engages the portion of the first flange 54a, the portion of the second flange 54b, or a combination thereof in order to guide the drain valve 100 into the drain 48. For example, an installer may slide the drain valve 100 along the first engine compartment lateral wall 52 until the installer feels the second end 106 engage one of the first flange 54a and the second flange 54b.

In some embodiments, an installer may not have visual access to the drain 48 when installed the drain valve 100 from a blind installation position outside of the vehicle 10. For example, the installer may stand next to the vehicle 10 and reach in with a hand to install the drain valve 100 without being able to visually inspect the drain 48. The drain valve 100 is configured to allow the installer to install the drain valve 100 from a blind installation position. For example, the installer may reach, with a hand holding the drain valve 100, into the engine compartment 20.

The support portion 102 is configured to indicate an installation direction to the installer without having to visually inspect the drain valve 100. For example, the installer may feel the drain valve 100 for the second end 106. The installer may position the drain valve 100 such that the second end 106 is positioned away from the drain 48. The installer may engage a portion of the first engine compartment lateral wall 52 disposed adjacent to the second vehicle cowl airbox 42 with a back portion 134 of the support portion 102. The back portion 134 is disposed on a side of the support portion 102 opposite the flat lateral surface 108.

The back portion 134 is configured to slide along the portion of the first engine compartment lateral wall 52 in order to guide the drain valve 100 toward the drain 48. The installer may slide the drain valve 100 along the portion of the first engine compartment lateral wall 52 until the second end 106 engages one or both of the first flange 54a and the second flange 54b, as described above. The installer may engage the ramped portion 126 with a finger or a thumb. The installer may apply pressure to the ramped portion 126 in the direction of the drain 48.

The tip 114 of the connecting portion 112 is inserted into the drain 48. The distal end 122 of the connecting portion 112 may then snap into the drain 48 as described above. The connecting portion 112 snapping into the drain 48 provides feedback (e.g., tactile feedback) to the installer indicating that the drain valve 100 is installed in the drain 48. The contoured flap 118 engages the portion of the second cowl panel 44 that defines the drain 48, as described above, to seal the drain 48 when the HVAC system is in use. The surface area of the contoured flap 118 prevents the installer from inserting the drain valve 100 beyond the contoured flap 118. For example, as described above, the surface area of the contoured flap 118 is larger than a surface area of the opening of the drain. When the contoured flap 118 engages the portion of the second cowl panel 44 that defines the drain, the contoured flap 118 extends beyond the opening of the drain. If the installer continues to apply a force on the drain valve 100 in the direction of the drain 48, the contoured flap 118 provides resistance against the second cowl panel 44. The resistance may provide feedback to the installer indicating that the drain valve 100 is fully installed in the drain 48.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A drain valve, comprising:
   a support portion having a first end and a second end, the first end having a width that is narrower than a width of the second end;
   a connecting portion extending from the support portion proximate the first end, the connecting portion comprising a tip disposed at a proximal end of the connecting portion, the tip being configured to engage a drain defined by a portion of a panel; and
   a contoured flap extending from a hinge disposed proximate the first end from a flat lateral surface of the support portion, the contoured flap having a profile corresponding to profile of the portion of the panel and having a durometer value that:
     allows the contoured flap to pivot on the hinge to allow flow from the drain; and
     in response to a negative pressure within the drain, allows the contoured flap to prevent flow through the drain.

2. The drain valve of claim 1, wherein the connecting portion includes a distal end configured to snap into the drain.

3. The drain valve of claim 2, wherein the distal end includes a width that is wider than the drain.

4. The drain valve of claim 2, wherein the width of the first end of the support portion is narrower than a width of the distal end of the connecting portion.

5. The drain valve of claim 1, wherein a surface area of the contoured flap is larger than an opening of the drain.

6. The drain valve of claim 1, wherein the support portion includes a ramped portion extending from the flat lateral surface of the support portion proximate the second end of the support portion.

7. The drain valve of claim 6, wherein the ramped portion is configured to facilitate directional guidance of the drain valve into the drain.

8. The drain valve of claim 1, wherein a width of the second end is wider than an opening disposed between a first flange of the panel attached to a portion of a lateral wall disposed adjacent to the panel and a second flange of the panel attached to the portion of the lateral wall.

9. A system for draining a vehicle cowl airbox disposed within an engine compartment of a vehicle, comprising:
   a drain disposed on the vehicle cowl airbox, the drain being defined by a portion of a panel of the vehicle cowl airbox; and
   a drain valve that includes:
      a support portion having a first end and a second end, the first end having a width that is narrower than a width of the second end;
      a connecting portion extending from the support portion proximate the first end, the connecting portion comprising a tip disposed at a proximal end of the connecting portion, the tip being configured to be received by the drain defined by the portion of the panel; and
      a contoured flap extending from a hinge disposed proximate the first end from a flat lateral surface of the support portion, the contoured flap having a profile corresponding to a profile of the portion of the panel and having a durometer value that:
         allows the contoured flap to pivot on the hinge to allow flow from the vehicle cowl airbox; and
         in response to a negative pressure within the vehicle cowl airbox, allows the contoured flap to prevent flow into the vehicle cowl airbox.

10. The system of claim 9, wherein the connecting portion includes a distal end configured to snap into the drain.

11. The system of claim 10, wherein the distal end includes a width that is wider than the drain.

12. The system of claim 10, wherein the width of the first end of the support portion is narrower than a width of the distal end of the connecting portion.

13. The system of claim 9, wherein a surface area of the contoured flap is larger than an opening of the drain.

14. The system of claim 9, wherein the support portion includes a ramped portion extending from the flat lateral surface of the support portion proximate the second end of the support portion.

15. The system of claim 14, wherein the ramped portion is configured to facilitate directional guidance of the drain valve into the drain.

16. The system of claim 9, wherein the width of the second end is wider than an opening disposed between a first flange of the panel attached to a portion of a lateral wall disposed adjacent to the panel and a second flange of the panel attached to the portion of the lateral wall.

17. The system of claim 9, wherein the negative pressure within the vehicle cowl airbox is generated by an HVAC system of the vehicle.

18. A method for installing a drain valve into a drain of a vehicle cowl airbox, comprising:
   engaging, with a support portion of the drain valve, a first flange of the vehicle cowl airbox attached to a portion of a lateral wall disposed adjacent to the vehicle cowl airbox;
   guiding the drain valve toward the drain by engaging a ramped portion of the drain valve extending from a flat lateral surface of the support portion proximate to a second end of the support portion;
   inserting a connecting portion that extends from a first end of the support portion into the drain;
   snapping a distal end of the connecting portion having a width that is wider than the drain onto a portion of a panel of the vehicle cowl airbox that defines the drain;
   sealing the drain by engaging the portion of the panel with a contoured flap having a surface area that is larger than an opening of the drain and that extends from the flat lateral surface proximate the first end of the support portion; and
   preventing the contoured flap from passing through the drain by engaging, by the second end of the support portion, at least a portion of the lateral wall.

19. The method of claim 18, further comprising, preventing mis-installation of the drain valve into the drain by providing the second end of the support portion having a width that is wider than the drain.

20. The method of claim 18, further comprising, engaging a second flange of the vehicle cowl airbox attached to the portion of the lateral wall, wherein the support portion has a width that is wider than an opening between the first flange and the second flange.

* * * * *